(12) United States Patent
Cai et al.

(10) Patent No.: US 8,001,660 B2
(45) Date of Patent: Aug. 23, 2011

(54) CABLE GRIPPING DEVICE

(75) Inventors: Xueming Cai, Cordova, TN (US); Joey Magno, Cordova, TN (US)

(73) Assignee: Thomas & Betts International, Inc, Wilmington, DE (US)

( * ) Notice: Subject to any disclaimer, the term of this patent is extended or adjusted under 35 U.S.C. 154(b) by 722 days.

(21) Appl. No.: 11/981,231

(22) Filed: Oct. 31, 2007

(65) Prior Publication Data

US 2009/0106947 A1    Apr. 30, 2009

(51) Int. Cl.
*F16G 11/10*     (2006.01)

(52) U.S. Cl. .................. 24/136 R; 24/136 A; 24/115 H; 292/307 R

(58) Field of Classification Search .......................... None
See application file for complete search history.

(56) References Cited

U.S. PATENT DOCUMENTS

| 206,169 | A | 7/1878 | Fayman |
| 749,896 | A | 1/1904 | Brown |
| 1,069,135 | A | 8/1913 | Heberling |
| 1,139,595 | A | 5/1915 | Starr |
| 1,165,785 | A | 12/1915 | Knoche |
| 1,201,169 | A | 10/1916 | Goepel |
| 1,203,782 | A | 11/1916 | Raymold |
| 1,238,167 | A | 8/1917 | McIntyre |
| 1,269,507 | A | 6/1918 | Proctor |
| 1,271,912 | A | 7/1918 | Kemper |
| 1,692,993 | A | 11/1928 | Lambert |
| 1,811,942 | A | 6/1931 | Kemper et al. |
| 2,356,209 | A | 8/1944 | Brilhart |
| 2,458,304 | A | 1/1949 | Runde |
| 2,897,563 | A | 8/1959 | Jonovich |
| 2,983,012 | A | 5/1961 | Madden |
| 3,094,755 | A | 6/1963 | Casanave |
| 3,770,307 | A | 11/1973 | Van Gompel |
| 3,900,184 | A | 8/1975 | Burke et al. ...................... 251/6 |
| 4,049,303 | A | 9/1977 | Irwin et al. .................... 292/307 |
| 4,640,538 | A | 2/1987 | Brammall |
| 4,681,355 | A | 7/1987 | Brammall et al. |

(Continued)

FOREIGN PATENT DOCUMENTS

CA    2295345    11/2001

(Continued)

OTHER PUBLICATIONS

Gripple Products—Gripple Rope Grips—www.gripple.com/construction/product—Sep. 5, 2007 Caddy Speed Link—Erico—Caddy Speed Link Universal Suport System—www.erico.com/products—Oct. 4, 2004 KwikWire—Cooper—KwikWire Hanging System—www.cooperbline.com/kwikwire—Oct. 30, 2007 Riz Enterprises, LLC—Zip-Clip—www.zip-clip.com Oct. 30, 2007.

(Continued)

*Primary Examiner* — Jack W. Lavinder
(74) *Attorney, Agent, or Firm* — G. Andrew Barger

(57) ABSTRACT

A device for gripping a cable is presented that has a retention member rotatably disposed within a cable guide such that upon entrance of the cable within an entrance port, the cable moves between the retention member and a wall, causing the retention member to simultaneously rotate and move toward the exit port and away from the wall until it abuts the exit wall and rotates in place as the cable is pushed out the exit port. When the cable is pulled toward the entrance port, the retention member simultaneously rotates and moves toward the entrance port and the wall, wedging the cable between the wall and the retention member.

14 Claims, 5 Drawing Sheets

U.S. PATENT DOCUMENTS

| | | | |
|---|---|---|---|
| 4,747,631 A | 5/1988 | Loynes et al. | 292/307 |
| 4,830,340 A | 5/1989 | Knitig | 254/391 |
| 4,878,270 A | 11/1989 | Westerkamp | |
| 5,015,023 A | 5/1991 | Hall | |
| 5,020,192 A | 6/1991 | Gerlach | |
| 5,092,641 A | 3/1992 | Penick | 292/307 |
| 5,147,145 A | 9/1992 | Facey et al. | 403/314 |
| 5,282,825 A | 2/1994 | Mack et al. | |
| 5,538,300 A | 7/1996 | Brown | 292/307 |
| 6,003,210 A | 12/1999 | Facey et al. | 24/130 |
| 6,058,574 A | 5/2000 | Facey et al. | |
| 6,131,969 A | 10/2000 | Natkins | 292/323 |
| D467,795 S | 12/2002 | Lyons | D8/395 |
| 6,546,600 B1 | 4/2003 | Lyons | 24/136 |
| 6,599,054 B2 | 7/2003 | Quimet | |
| D553,575 S | 10/2007 | Littrell et al. | D13/154 |
| D574,701 S | 8/2008 | Clarke | D8/383 |
| D579,411 S | 10/2008 | Jowett | D13/133 |
| 2003/0115723 A1 | 6/2003 | Shuey | |
| 2006/0196016 A1 | 9/2006 | Cai et al. | |
| 2009/0106947 A1 | 4/2009 | Cai et al. | 24/136 |
| 2010/0038611 A1 | 2/2010 | Lambourn et al. | 256/53 |

FOREIGN PATENT DOCUMENTS

| | | | |
|---|---|---|---|
| CA | 2424845 | 11/2003 | |
| CA | 2117452 | 8/2004 | |
| CA | 2170701 | 4/2005 | |
| CA | 2242576 | 2/2006 | |
| CA | ID120231 | 1/2008 | 3/5 |
| CA | 2676420 | 8/2008 | |
| CA | 2710568 | 9/2009 | |
| DE | 35 05 437 A1 | 6/1986 | |
| EP | 1 698 802 A2 | 6/2006 | |
| EP | 1 698 802 A3 | 10/2007 | |
| EP | 1 967 759 A1 | 10/2008 | |
| FR | 2226882 | 11/1974 | |
| GB | 301285 | 11/1928 | |
| GB | 2322435 | 8/1998 | |
| WO | WO 93/04303 | 3/1993 | |
| WO | WO 00/01958 | 1/2000 | |
| WO | WO 2010/002265 | 1/2010 | |
| WO | WO 2010/142690 | 12/2010 | |

OTHER PUBLICATIONS

Wire Rope Suspension System—Ductmate—www.ductmate.co.uk/cablematepresentation—Oct. 30, 2007 Gripple Products—Hangers—www.gripple.com/construction/product—Oct. 9, 2007.

US 8,001,660 B2

CABLE GRIPPING DEVICE

FIELD OF THE INVENTION

In general the present invention relates to gripping devices and, in particular, to a device for releasably gripping a cable.

BACKGROUND

Industrial, commercial and residential construction sites typically require the suspension of equipment (such as HVAC units and ducts, lighting structures, various construction equipment and tools, audio speakers, and roofing materials) from structural members (such as overhead beams, ceilings, roofs, cranes, and girders). A suspension cable such as a metallic or rubber rope or wire is used to aid in this suspension. It is typically attached on one end to the structural member such as an eyebolt, anchor or shot fired member. Alternatively, the suspension cable can be inserted through a wedge device, looped around the equipment, and finally the cable is inserted through the wedge device a second time to retain the cable in place and suspend the equipment that is supported by the cable. Prior devices have inner jaws or teeth members that can twist within the housing and thereby weaken their grip on the cable. High stress is also created on the housing because the jaws do not move parallel to the cable within the housing. In addition, the teeth of prior devices can cut through the cable during high-tension operations and have a difficult time piercing smooth cable. If the cable is coated in insulation, the teeth can damage the appearance of the cable and cause the encased metal wires to be exposed. These prior devices also employ springs within them to create the wedge on the cable. Springs change properties over time and can wear out. Such prior wedge devices are not hermaphroditic and are difficult to manufacture and assemble. They also consist of many parts and are costly to manufacture.

SUMMARY

The present invention eliminates the above difficulties and disadvantages by providing an improved device for gripping a cable. The device comprises the device comprises a first entrance port for receiving the cable and a first entrance wall wherein the entrance port is disposed. A first exit port is aligned with the first entrance port and from where the cable exits the device. A first exit wall is included wherein the first exit port is disposed and a first wall is disposed between the first entrance port and the first exit port. A first cable guide forms a pathway between the first entrance port and the first exit port and generally slopes toward the first exit port. A first retention member is rotatably disposed within the first cable guide. Because rotation friction is less than the sliding friction, upon entrance of a cable within the first entrance port, the cable moves between the first retention member and the first wall, causing the first retention member to simultaneously rotate and move toward the first exit port and away from the first wall until it abuts the first exit wall and rotates in place as the cable is pushed out the first exit port.

Because rotation friction is less than the sliding friction, extracting the cable is highly difficult without destroying the cable gripping device. For instance, when the cable is pulled near the first entrance port, the first retention member rolls toward the first entrance port and the first cable guide forces the first retention member toward the first entrance port, which slopes toward the first entrance port thereby wedging the cable with great force between the first wall of the cable gripping device and the first retention member.

A second entrance port is provided for receiving the free end of the cable after it leaves the first exit port and is inserted through an eyelet, for example, that is attached to equipment or bundled around a group of generally linear items for shipping such as logs or electrical distribution poles. The device further includes a second entrance port for receiving the cable and a second entrance wall wherein the entrance port is disposed. A second exit port is aligned with the second entrance port and from where the cable exits the device. A second exit wall is included wherein the second exit port is disposed and a second wall is disposed between the second entrance port and the second exit port. A second cable guide forms a pathway between the second entrance port and the second exit port and generally slopes toward the second exit port. A second retention member is rotatably disposed within the second cable guide. Because rotation friction is less than the sliding friction, upon entrance of a cable within the second entrance port, the cable moves between the second retention member and the second wall, causing the second retention member to simultaneously rotate and move toward the second exit port and away from the second wall until it abuts the second exit wall and rotates in place as the cable is pushed out the second exit port.

Because rotation friction is less than the sliding friction, extracting the cable is highly difficult without destroying the cable gripping device. For instance, when the cable is pulled near the second entrance port, the second retention member rolls toward the second entrance port and the second cable guide forces the second retention member toward the second entrance port, which slopes toward the second entrance port thereby wedging the cable with great force between the second wall of the cable gripping device and the second retention member.

Release means are provided in the present invention via apertures that are disposed on each side of the device and into which an actuation member is inserted for moving the retention members away from the first or second entrance walls.

DETAILED DESCRIPTION OF THE PREFERRED EMBODIMENT(S)

Figure 1:
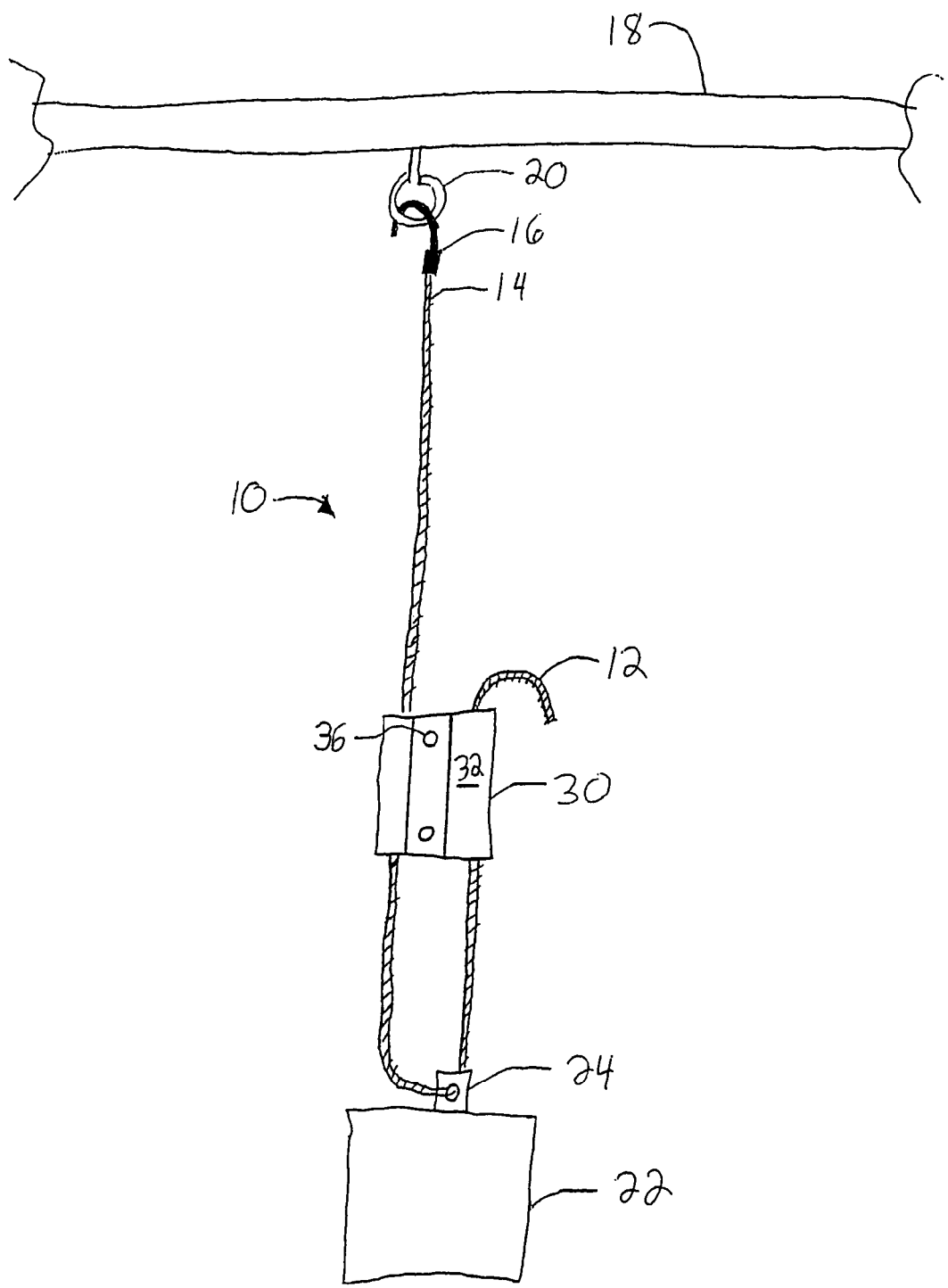
FIG. 1 is a side elevational view of an equipment hanging system having a device for gripping a cable of the present invention.
Figure 5:
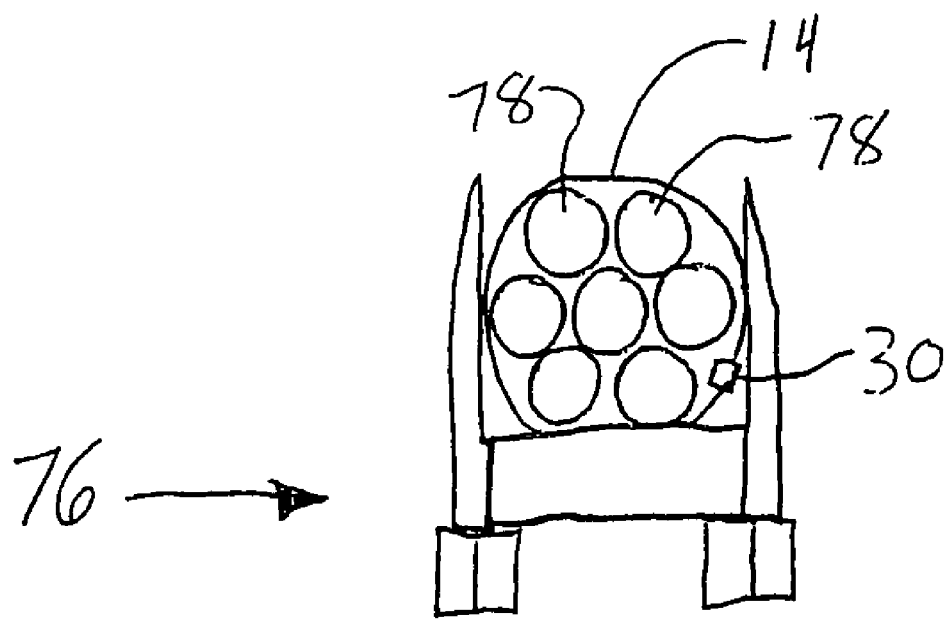
FIG. 5 is a rear elevational view of a bundling system having the device for gripping a cable of the present invention.

The above and other features, aspects, and advantages of the present invention will now be discussed in the following detailed description and appended claims, which are to be considered in conjunction with the accompanying drawings in which identical reference numbers designate like elements throughout the views. Shown in FIG. 1 is a system for hanging equipment 22 or bundling a group of objects such as electrical distribution poles 78 (Shown in FIG. 5) for shipping. The system includes a cable 10 that may be secured to a structural member 18 such as a support beam by a hook 16, the hook 16 being secured to an attachment end 14 of the cable 10 via a crimp device or soldering. The hook 16 engages an eyelet 20 that is mounted on the structural member 18. The free end 12 of the cable 10 is inserted through device 30 and then inserted through an eye 24 that is secured to the equipment 22 and finally back through device 30 that secures the cable 10 from slipping and allows the equipment 22 to be suspended in air. The present system and device have many applications. Another application is shown in FIG. 5, which displays a truck 76 that is carrying a load of logs of electrical distribution poles 78. In this application device 30 and cable 10 are used to bundle poles 78.

Figure 2:
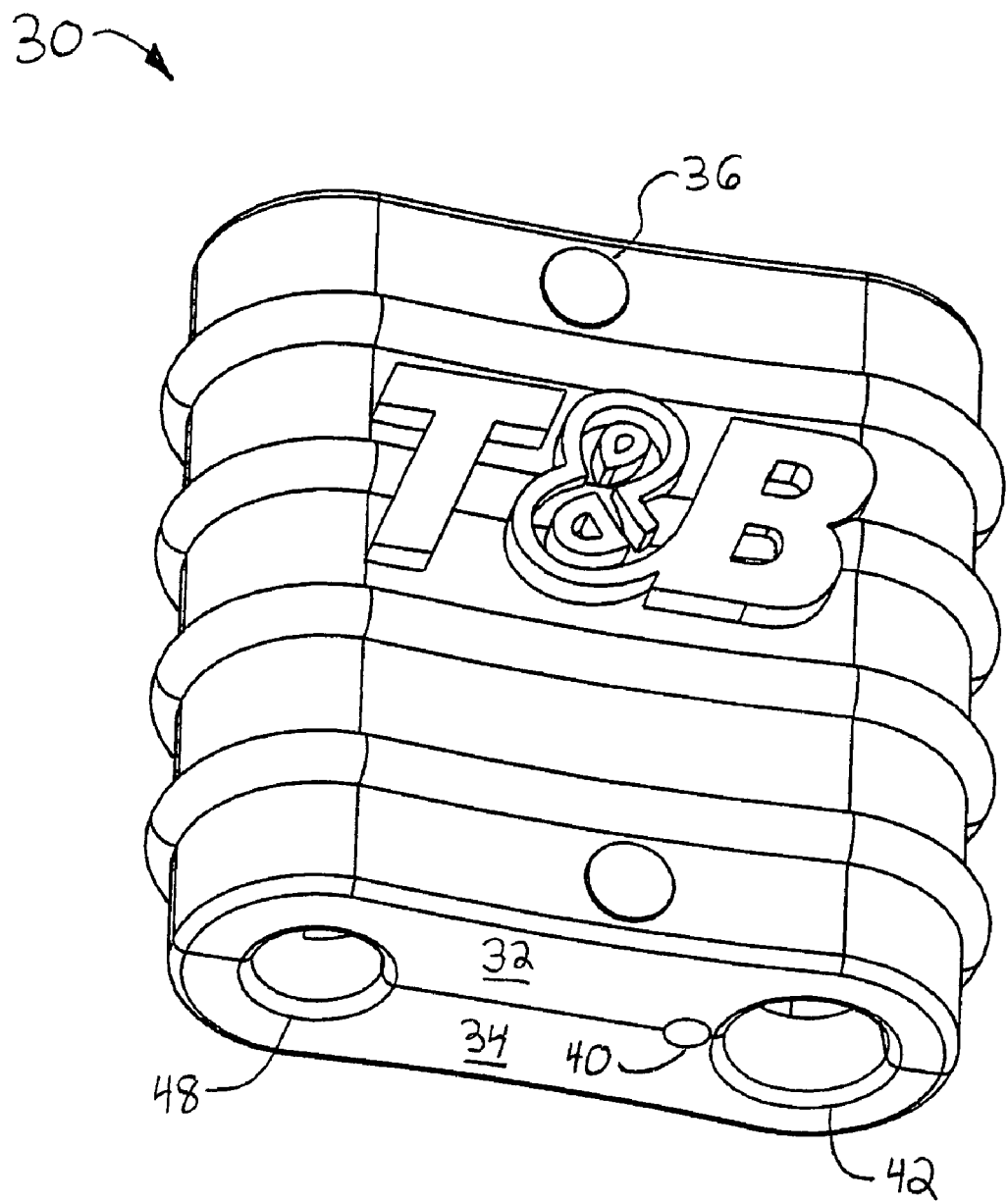
FIG. 2 is a perspective view of the device for gripping a cable of the present invention.
Figure 3:
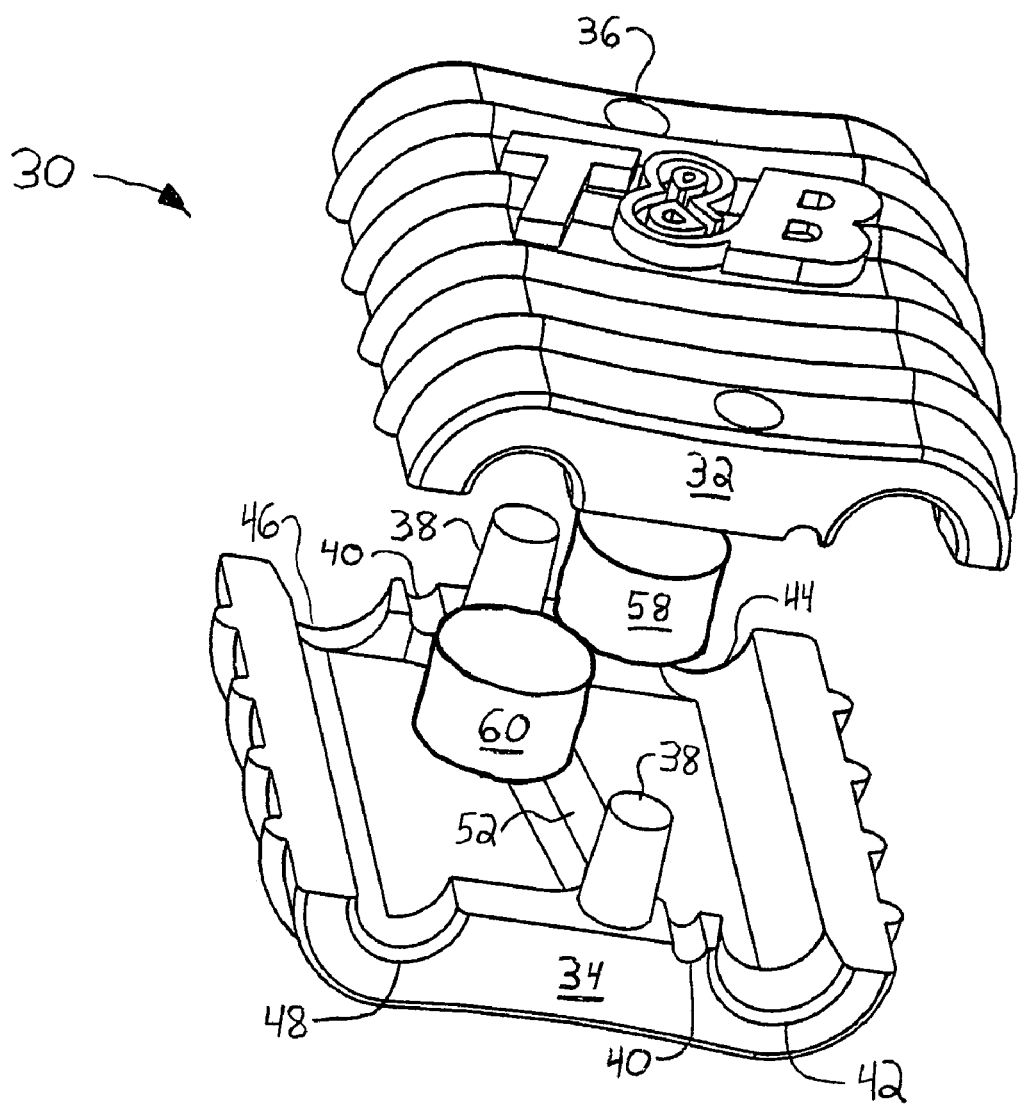
FIG. 3 is a perspective view of the device for gripping a cable of the present invention.

Turning now to the device 30 and that is shown in FIGS. 2 and 3, the device 30 is preferably constructed of a rust inhibited metal such as galvanized steel, but can also be constructed of a thermo-formed plastic. The device 30 is comprised of two half shells, first shell 32 and second shell 34, which are preferably welded together. Metal standoffs 38 are integrally formed into second shell 34 and made of the same material. Standoffs 38 are at preferably riveted at 36 to first shell 32 to stake the first shell 32 to the second shell 34 and keep the device 30 closed to prevent tampering in the field.

Figure 4:
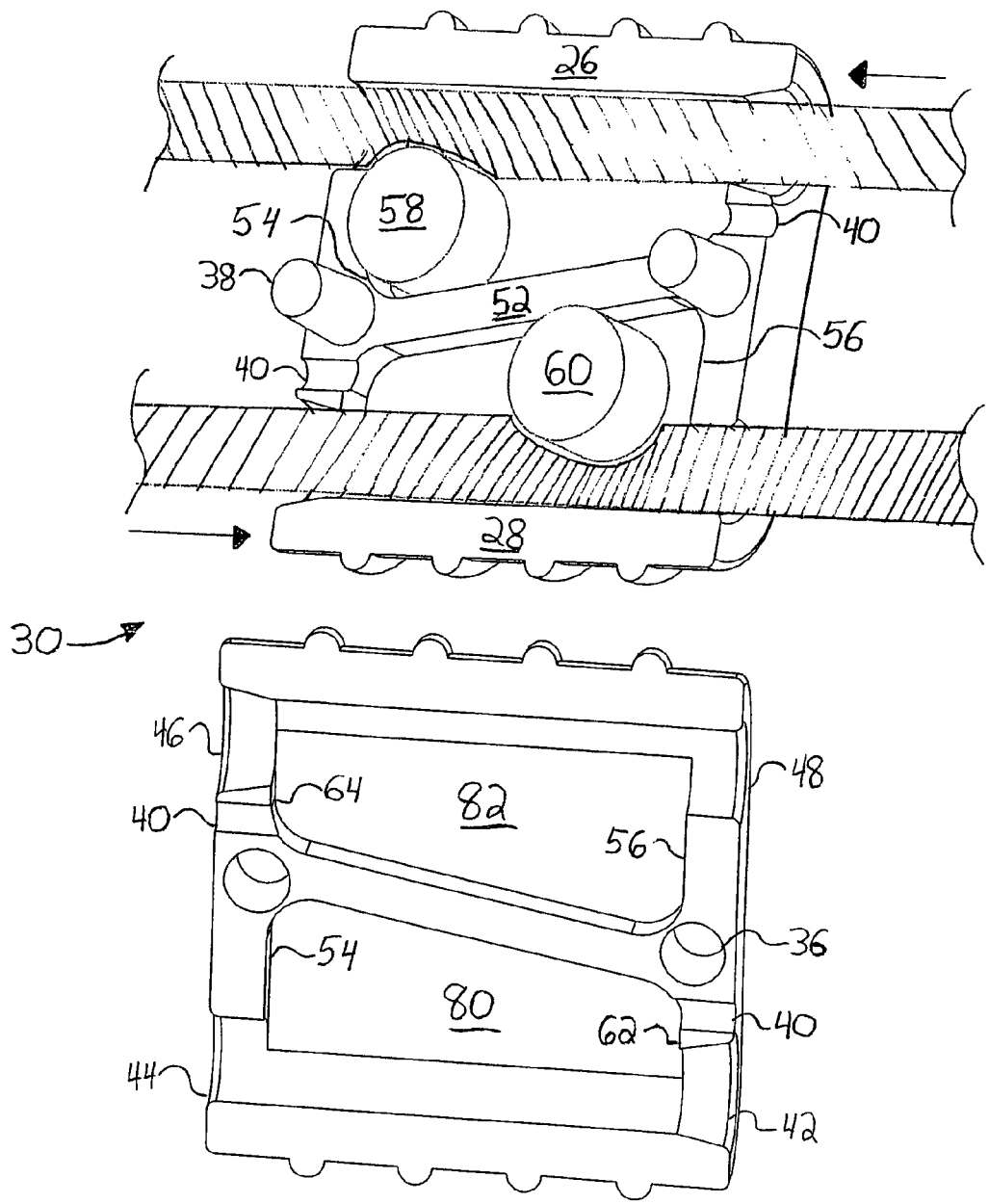
FIG. 4 is a perspective view of a retention member of the device for gripping a cable of the present invention.

As shown in FIGS. 3 and 4, the device 30 only has four parts: the first and second shells 32 and 34, and the first and second retention members 58 and 60, respectively. This greatly reduces the manufacturing and installation costs of device 30. In particular, a first entrance port 42 is provided for receiving the free end 12 of cable 10. The first entrance port 42 is preferably circular in shape, but could be of any shape that would allow for insertion of cable 10. The first entrance port 42 is angled or beveled to aid in entrance of the free end 12 of cable 10 and is disposed in a first entrance wall 62. A first exit port 44 is provided opposite the first entrance port 42 that is preferably circular in shape, but could be of any shape that would allow for the passage through of cable 10. The first exit port 44 is axially aligned with the first entrance port 42. It is from the first exit port 44 where the free end 12 of cable 10 exits device 30. The first exit port 44 is disposed in a first exit wall 54. A first wall 26 is disposed between, and adjoins, the first entrance port 42 and the first exit port 44. The first wall 26 is smooth on the interior of the device 30 and its outer surface is of any desired texture or shape to aid in gripping of the device 30 by an installer.

In addition, a first cable guide 80 forms a pathway between the first entrance port 42 and the first exit port 44 that is trapezoidal in shape with the first entrance wall 62 and first exit wall 54 being parallel. The first wall 26 is formed at right angles to the first entrance wall 62 and first exit wall 54. A dividing wall 52, which is preferably constructed of the same material as the rest of the device 30, forms the fourth wall of the trapezoid and first cable guide 80.

A first retention member 58 is included that is preferably made of metal, but can be on any durable material such as thermo-formed plastic. The first retention member 58 is rotatably disposed within the first cable guide 80 such that upon entrance of the cable 10 within the first entrance port 42, the cable 10 moves between the first retention member 58 and the first wall 26, causing the first retention member 58 to simultaneously rotate and move toward the first exit port 44 and away from the first wall 26. This occurs until the first retention member 58 abuts the first exit wall 54 and rotates in place as the cable 10 is pushed out the first exit port 44. The first retention member 58 has a circular cross section and is disc-like in shape, but it is understood that it could also be spherical. The surface of the first retention member 58 that contacts cable 10 is preferably smooth to prevent abrasion of cable 10, but can also be of a rough texture for increased gripping of cable 10. The first retention member 58 rotates on an axis that is orthogonal to the direction of cable movement through the device 30 and freely moves among the first wall 26, first exit port 44, dividing wall 52 and first entrance wall 62 without cable 10 in the device 30 as a result of the first retention member 58 being unattached within the device 30. Therefore, easy insertion of cable 10 into the first entrance port 42, through the first cable guide 80 and out the first exit port 44 is provided.

After insertion of cable 10 in the manner described above, when cable 10 is pulled in the opposite direction by an installer grasping cable 10 near the first entrance port 42 and pulling away from the device 30, the first retention member 58 simultaneously rotates and moves toward the first entrance wall 62 and rises toward the first wall 26 until it is prevented from rotating further, wedging cable 10 between the first wall 26 and the first retention member 58. This wedging of cable 10 causes no degradation in the exterior of the cable 10 even if the cable 10 is sheathed in a plastic sleeve. When this wedging occurs the cable 10 cannot be pulled from the device 30 without extreme force that may actually break the device 30. Therefore the load the cable 10 has on it is prevented from slipping and falling to the ground.

A second entrance port 46 is also provided and that is angled or beveled for receiving the free end 12 of cable 10 after it leaves the first exit port 44 and is inserted through the eye 24, for example, that is attached to the equipment 22 or bundled around a group of generally linear items for shipping such items as logs or electrical distribution poles 78 as shown in FIG. 5. The second entrance port 46 is preferably circular in shape, but could be of any shape that would allow for insertion of cable 10. The second entrance port 46 is angled or beveled to aid in entrance of the free end 12 of cable 10 and is disposed in a second entrance wall 64. A second exit port 48 is provided opposite the second entrance port 46 that is preferably circular in shape, but could be of any shape that would allow for the passage through of cable 10. The second exit port 48 is axially aligned with the second entrance port 46. It is from the second exit port 48 where the free end 12 of cable 10 exits device 30. The second exit port 48 is disposed in a second exit wall 56. A second wall 28 is disposed between, and adjoins, the second entrance port 46 and the second exit port 48. The second wall 28 is smooth on the interior of the device 30 and its outer surface is of any desired texture or shape to aid in gripping of the device 30 by an installer.

In addition, a second cable guide 82 forms a pathway between the second entrance port 46 and the second exit port 48 that is trapezoidal in shape with the second entrance wall 64 and second exit wall 56 being parallel. The second wall 28 is formed at right angles to the second entrance wall 64 and second exit wall 56. A dividing wall 52, which is preferably constructed of the same material as the rest of the device 30, forms the fourth wall of the trapezoid and second cable guide 82.

A second retention member 60 is included that is preferably made of metal, but can be on any durable material such as thermo-formed plastic. The second retention member 60 is rotatably disposed within the second cable guide 82 such that upon entrance of the cable 10 within the second entrance port 46, the cable 10 moves between the second retention member 60 and the second wall 28, causing the second retention member 60 to simultaneously rotate and move toward the second exit port 48 and away from the second wall 28. This occurs until the second retention member 60 abuts the second exit wall 56 and rotates in place as the cable 10 is pushed out the second exit port 48. The second retention member 60 has a circular cross section and is disc-like in shape, but it is understood that it could also be spherical. The surface of the second retention member 60 that contacts cable 10 is preferably smooth to prevent abrasion of cable 10, but can also be of a rough texture for increased gripping of cable 10. The second retention member 60 rotates on an axis that is orthogonal to the direction of cable movement through the device 30 and freely moves among the second wall 28, second exit port 48, dividing wall 52 and second entrance wall 64 without cable 10 in the device as a result of the second retention member 60 being unattached within the device 30. Therefore, easy insertion of cable 10 into the second entrance port 46, through the second cable guide 82 and out the second exit port 48 is provided.

After insertion of cable 10 in the manner described above, when cable 10 is pulled in the opposite direction by an installer grasping cable 10 near the second entrance port 46 and pulling away from the device 30, the second retention member 60 simultaneously rotates and moves toward the second entrance wall 64 and rises toward the second wall 28 until it is prevented from rotating further, wedging cable 10 between the second wall 28 and the second retention member 60. This wedging of cable 10 causes no degradation in the exterior of the cable 10 even if the cable 10 is sheathed in a plastic sleeve. When this wedging occurs the cable 10 cannot be pulled from the device 30 without extreme force that may actually break the device 30. Therefore the load the cable 10 has on it is prevented from slipping and falling to the ground.

It is also noted that the dividing wall 52 separates the first cable guide 80 from the second cable guide 82 such that the first and second retention members, 58, 60, respectively, do not come in contact with each other.

As shown in FIGS. 2 and 3, a cable release aperture 40 is disposed in the first shell 32 and the second shell 34 for releasing the grip of first and second retention members 58, 60, respectively, on cable 10 by insertion of an actuation member (not shown) therein. In particular, apertures 40 are in communication with the first cable guide 80 and second cable guide 82. The actuation member is preferably a plastic, metallic or wooden rod that is inserted into aperture 40 such that it abuts first retention member 58 or second retention member 60 depending on which aperture 40 the actuation member is inserted into. When contact is made between the actuation member and the first retention member 58, the first retention member 58 is pushed toward the first exit wall 54 thereby releasing wedging pressure on cable 10 as first retention member 58 moves away from cable 10 within the first cable guide 80. Cable 10 can then be removed from device 30 by pulling cable 10 from first entrance port 42 while the actuation member is pushing against the first retention member 58. Likewise, when contact is made between the actuation member and the second retention member 60, the second retention member 60 is pushed toward the second exit wall 56 thereby releasing wedging pressure on cable 10 as second retention member 60 moves away from cable 10 within the second cable guide 82. Cable 10 can then be removed from the second entrance port 46 of the device 30 by pulling cable 10 from second entrance port 46 while the actuation member is pushing against the second retention member 60.

Although the invention has been described in detail above, it is expressly understood that it will be apparent to persons skilled in the relevant art that the invention may be modified without departing from the spirit of the invention. Various changes of form, design, or arrangement may be made to the invention without departing from the spirit and scope of the invention. Therefore, the above-mentioned description is to be considered exemplary, rather than limiting, and the true scope of the invention is that defined in the following claims.

What is claimed is:

1. A device for gripping a cable having a free end, the device comprising:
   a first entrance port for receiving the free end of the cable;
   a first entrance wall wherein the entrance port is disposed;
   a first exit port aligned with the first entrance port and from where the free end of the cable exits the device;
   a first exit wall wherein the first exit port is disposed;
   a first wall disposed between the first entrance port and the first exit port;
   a first cable guide forming a pathway between the first entrance port and the first exit port;
   a first retention member rotatably disposed within the first cable guide such that upon entrance of the cable within the first entrance port, the cable moves between the first retention member and the first wall, causing the first retention member to simultaneously rotate and move toward the first exit port and away from the first wall until it abuts the first exit wall and rotates in place as the cable is pushed out the first exit port, and when the cable is pulled toward the first entrance port, the first retention member simultaneously rotates and moves toward the first entrance port and the first wall, wedging the cable between the first wall and the first retention member;
   a second entrance port for receiving the free end of the cable;
   a second entrance wall wherein the entrance port is disposed;
   a second exit port aligned with the second entrance port and from where the free end of the cable exits the device;
   a second exit wall wherein the second exit port is disposed;
   a second wall disposed between the second entrance port and the second exit port;
   a second cable guide forming a pathway between the second entrance port and the second exit port; and
   a second retention member rotatably disposed within the second cable guide such that upon entrance of the cable within the second entrance port, the cable moves between the second retention member and the second wall, causing the second retention member to simultaneously rotate and move toward the second exit port and away from the second wall until it abuts the second exit wall and rotates in place as the cable is pushed out the second exit port, and when the cable is pulled toward the second entrance port, the second retention member simultaneously rotates and moves toward the second entrance port and the second wall, wedging the cable between the second wall and the second retention member.

2. The device of claim 1 wherein the first and second retention members rotate on an axis that is orthogonal to the direction of cable movement through the device.

3. The device of claim 1 wherein the first and second retention members are unattached within the device.

4. The device of claim 1 wherein the first retention member freely moves among the first wall, first exit wall and first entrance wall without the cable in the device.

5. The device of claim 1 wherein the first and second retention members are constructed of metal.

6. A device for gripping a cable having a free end, the device comprising:
   a first entrance port for receiving the free end of the cable;
   a first entrance wall wherein the entrance port is disposed;
   a first exit port aligned with the first entrance port and from where the free end of the cable exits the device;
   a first exit wall wherein the first exit port is disposed;

a first wall disposed between the first entrance port and the first exit port;

a first cable guide forming a pathway between the first entrance port and the first exit port;

a first retention member rotatably disposed within the first cable guide such that upon entrance of the cable within the first entrance port, the cable moves between the first retention member and the first wall, causing the first retention member to simultaneously rotate and move toward the first exit port and away from the first wall until it abuts the first exit wall and rotates in place as the cable is pushed out the first exit port, and when the cable is pulled toward the first entrance port, the first retention member simultaneously rotates and moves toward the first entrance port and the first wall, wedging the cable between the first wall and the first retention member;

a second entrance port for receiving the free end of the cable;

a second entrance wall wherein the entrance port is disposed;

a second exit port aligned with the second entrance port and from where the free end of the cable exits the device;

a second exit wall wherein the second exit port is disposed;

a second wall disposed between the second entrance port and the second exit port;

a second cable guide forming a pathway between the second entrance port and the second exit port;

a second retention member rotatably disposed within the second cable guide such that upon entrance of the cable within the second entrance port, the cable moves between the second retention member and the second wall, causing the second retention member to simultaneously rotate and move toward the second exit port and away from the second wall until it abuts the second exit wall and rotates in place as the cable is pushed out the second exit port, and when the cable is pulled toward the second entrance port, the second retention member simultaneously rotates and moves toward the second entrance port and the second wall, wedging the cable between the second wall and the second retention member; and a dividing wall separating the first cable guide from the second cable guide such that the first and second retention members do not come in contact with each other.

7. The device of claim 6 wherein the first and second retention members rotate on an axis that is orthogonal to the direction of cable movement through the device.

8. The device of claim 6 wherein the first and second retention members are unattached within the device.

9. The device of claim 6 wherein the first retention member freely moves among the first wall, dividing wall, first exit wall and first entrance wall without the cable in the device.

10. The device of claim 6 wherein the second retention member freely moves among the second wall, dividing wall, second exit wall and second entrance wall without the cable in the device.

11. The device of claim 6 wherein the first and second retention members are constructed of metal.

12. The device of claim 11 wherein the second retention member is constructed of metal.

13. The device of claim 6 further including at least one standoff integral formed with and internal to the device.

14. The device of claim 13 wherein the thickness of the first and second retention members is less than or equal to the height of the at least one standoff.

* * * * *